United States Patent [19]
Bernhard et al.

[11] 3,862,620
[45] Jan. 28, 1975

[54] ANIMAL CAGE WITH LOCK DEVICE
[75] Inventors: Robert W. Bernhard, Greenfield; Glen A. Rork, Indianapolis, both of Ind.
[73] Assignee: Eli Lilly and Company, Indianapolis, Ind.
[22] Filed: July 17, 1972
[21] Appl. No.: 272,515

[52] U.S. Cl. ................................. 119/17, 292/162
[51] Int. Cl. ........................................... A01k 01/02
[58] Field of Search ........... 119/17, 18, 19; 292/162

[56] References Cited
UNITED STATES PATENTS
3,565,563  2/1971  Radach ................................. 119/18
3,651,786  3/1972  Patterson et al. ..................... 119/17

Primary Examiner—Hugh R. Chamblee
Attorney, Agent, or Firm—Houston L. Swenson

[57] ABSTRACT

A cage primarily designed for housing a laboratory animal has an improved locking device comprising a horizontal bar with a plurality of stops on it which can be selectively positioned to prevent unwanted opening of the cage's door and other moveable components.

6 Claims, 3 Drawing Figures

PATENTED JAN 28 1975
3,862,620
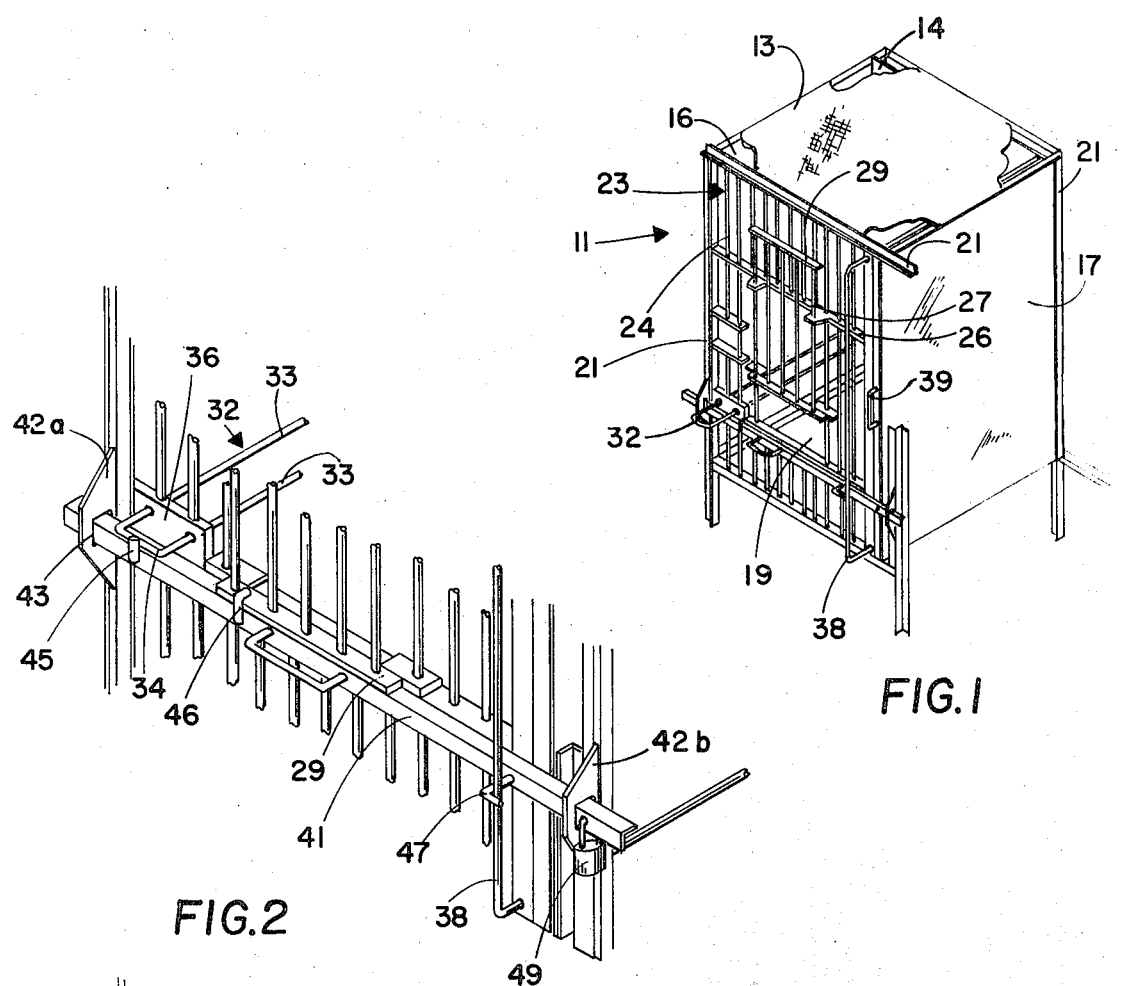
FIG.1
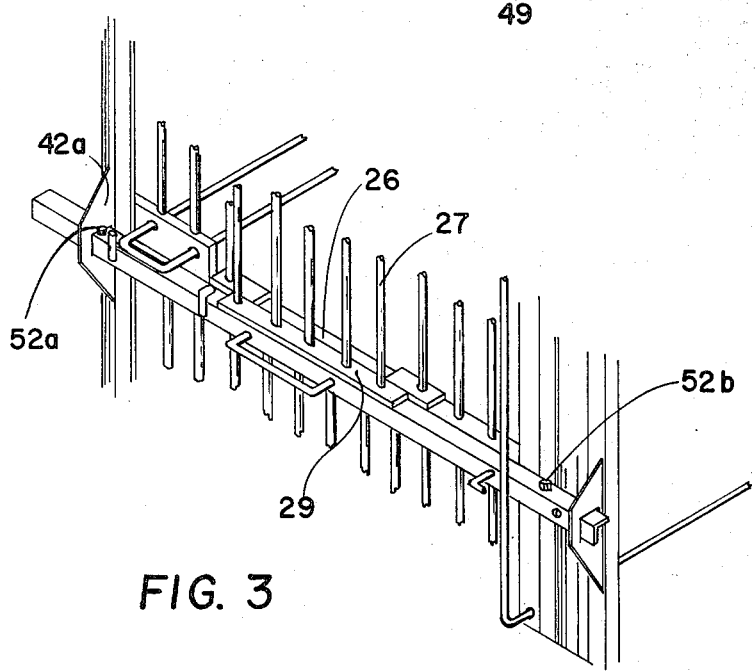
FIG.2
FIG.3

3,862,620

ANIMAL CAGE WITH LOCK DEVICE

BACKGROUND OF THE INVENTION

For a number of years a variety of animals have been used for laboratory purposes. In particular, these animals have been used to determine the effects of various types of drugs under study which have not yet been marketed. Many of these tests last for a fairly long duration such as 1 to 3 years. It has been found that one of the most meaningful animals to use in such studies is the monkey inasmuch as its physiological characteristics resemble those of a human being. Thus a variety of animal cages have been developed which are used to house these laboratory animals for long periods of time.

The intelligence level of monkeys in particular is fairly high in the animal world and it has not been uncommon to experience the escape of a monkey from its cage. This is particularly true when the monkey has been housed in the same cage for several months and has been able to observe the animal keepers manipulate the locking mechanism of the cage. With the increase in requirements for drug studies prior to their release to the public, additional animals have been used and the problem of properly housing them has become multiplied within the last several years. Consequently, the need for an animal cage having a locking device which is readily manipulated by human beings but yet substantially escape proof with respect to intelligent animals such as monkeys has greatly increased within the last few years. It is therefore an object of our invention to provide an animal cage with such an improved locking device.

SUMMARY OF THE INVENTION

Our invention relates to a rectangular animal cage having a guillotine door for access to the interior of the cage and with a plurality of walls, one or more, which are moveable. The improved locking device of our invention comprises a horizontal rigid bar which is slideably positioned across the exterior of the cage's front wall. Each of the moveable walls has a pull handle which extends through the front wall and is substantially adjacent or contiguous to the locking bar. The bar has a plurality of stop elements which extend from the bar to block movement of the guillotine door and moveable walls when the bar is positioned in its locking relationship with the cage. Upon moving the bar in a horizontal manner the stop elements assume a position that does not interfere with the movement of the cage door and back walls.

BRIEF DESCRIPTION OF THE DRAWING

FIG. 1 is a perspective view of an animal cage embodying our locking device;

FIG. 2 is an enlarged and partial perspective view of the locking device of our invention in its locked position; and FIG. 3 is a perspective view of the locking device in its unlocked position.

DETAILED DESCRIPTION OF THE PREFERRED EMBODIMENT

Referring to FIG. 1 an animal cage 11 is illustrated which is contructed of heavy and rigid materials such as sheet metal and metallic bars. Cage 11 has a top wall 13 which is partially broken away to disclose a moveable back wall 14. Associated with these walls are a pair of side walls 16 and 17 and a bottom wall 19. These walls are conventionally designed and are supported by a number of support angle irons 21 and cooperate with front wall 23 to provide a rectangular cage. Front wall 23 is formed of a plurality of vertical steel bars 24 with one or more horizontal steel bar support members 26. A cage door 27 is formed from a pair of upper and lower plate members 29 through which a plurality of steel bars are positioned. Door 27 is slidably positioned in mounts on support members 26 for vertical movement. Door 27 has been referred to in the trade as a guillotine type door in view of its vertical sliding action.

In the particular illustration of our invention cage 11 has a pair of moveable walls which comprise back wall 14 and the right side wall 17. The use of a back wall is for the purpose of being able to force the animal in the cage toward front wall 23 prior to opening the cage door. Movement of the back wall is effected by means of pull handle 32 which comprises a pair of substantially long rods 33 joined at their front end by handle rod 34 and connected at their rear end to the false back wall 14. Rods 33 are slidably positioned within a guide and support element 36 that forms a part of the cage's front wall. A second elongated pull handle 38 is provided which has similar bars for connecting to the back wall. Right side wall 17 serves as a moveable barrier between the illustrated cage and an adjacent cage which has not been illustrated in order to illustrate more clearly our invention. Movement of this side wall 17 to permit access between adjacent cages is effected by handle 39 which is used to pull the wall 17 forward. It is to be noted that removal of wall 17 cannot be accomplished without first removing the horizontal lock bar.

The improved locking device for the cage described above comprises a rigid bar 41 which is mounted across the exterior of the front wall 23. In the particular embodiment lock bar 41 is an angle iron, but it is to be understood that the principles of our invention may also be embodied in a rectangular or circular bar. Lock bar 41 is supported at its two ends by a pair of like bar supports 42a and 42b for horizontal sliding movement therein. Supports 42a and 42b have a right angle cut 43 which conforms with the configuration of the bar angle irons. Lock bar 41 has a first stop element 45 comprising a rod projection welded onto the bar and which extends upwards to be positioned in line with the forward movement of the pull handle 32. A second stop element 46, also formed of a rod welded to the bar takes on the general configuration of an "L" and extends upwardly and inwardly to overlap a portion of the bottom plate member 29 of the cage door 27. A third stop element 47 which may also be formed from a steel rod welded to the lock bar extends outwardly therefrom and has a right angle extension that overlaps the other pull handle 38 for the false back wall. A locking device which may be a padlock 49 is placed on the far end of the locking bar just to the right of its support plate to prevent unauthorized movement of the bar.

In FIG. 2 the locking bar is in its locked position wherein in FIG. 3 the bar has been moved to the left approximately 1 to 2 inches and is now in its unlocked position. Prior to moving the locking bar into its unlocked position, the padlock 49 has been removed. Movement of the lock bar to the left is limited by a limit bolt 52a which will abut against the left support 42. With the lock bar positioned to its far left as shown in FIG. 3, the bar is no longer blocking movement of the cage door 27 or the false back wall 14. Limit bolt 52b is provided at the right end of the lock bar to limit its movement to the right, further assuring against accidental falling of the bar at its opposite end.

If a multi-unit cage structure utilizes our invention lock bar 41 has a repeated sequence of stop elements 45, 46 and 47 which serves to lock an adjacent cage. In such an arrangement it is possible to first move lock bar 41 to the left whereby bolt 52a abuts the support plate. Pull handles 32 and 38 are thereby freed for forward movement as is the cage door freed for upward movement. Such a movement can be partially made and then the lock bar 41 may be repositioned to its original location, thereby locking the adjacent cage elements while still permitting the cage door and back wall of the first unit to be moveable. Thus the cage bar can serve to lock one cage unit and yet permit access to an adjacent unit.

In the illustrated embodiment support plate 42b is positioned for a single cage. If the cage is to be combined with a second unit, the support 42b would be positioned to the right of the second unit adjacent the right end of the lock bar 41. Thus, there would be no support midway between the cages. If sidewall 17 is to be removed to permit access between the cages stop bolt 52a or 52b is removed whereby one end of the lock bar is dropped from its support. Upon removal of the lock bar from its other support the wall 17 may be pulled out by handle 39.

We claim:

1. In an animal cage defined by a pair of side walls connected to front and back walls and top and bottom walls, said front wall having a door mounted for vertical sliding to open and closed positions, and a false back wall within said cage normally adjacent to said back wall and slidably positioned therein for movement toward said front wall, the improvement of a lock device comprising a rigid bar mounted across the exterior of said front wall for selective horizontal movement, an elongated pull handle connected to said back plate and extending through said front wall contiguous to said bar, said bar having first and second stop elements extending therefrom and blocking movement of said pull handle and door in their locked position and permitting movement upon horizontally moving said bar to a predetermined unlocked position.

2. The improvement in an animal cage as defined in claim 1 in which said bar is slidably mounted for horizontal movement through a pair of bar supports on opposite edges of said cage's front wall.

3. The improvement in an animal cage as defined in claim 2 in which said bar has a limit bolt removably mounted near each of its two ends of abutment against said bar supports upon movement of said bar in either direction a predetermined distance.

4. The improvement in an animal cage as defined in claim 3 in which said first stop element is a rigid rod extending from said bar in line with the forward movement of said pull handle.

5. The improvement in an animal cage as defined in claim 4 in which said second stop element is a rigid rod extending from said bar to overlap a portion of a bottom member of said cage door.

6. The improvement in an animal cage as defined in claim 5 in which unauthorized horizontal movement of said bar is prevented by a lock device removably affixed to said bar adjacent a bar support.

* * * * *